(12) United States Patent
Moore et al.

(10) Patent No.: US 8,520,520 B2
(45) Date of Patent: Aug. 27, 2013

(54) SYSTEM AND METHOD FOR PER FLOW GUARANTEED THROUGHPUT, MULTIPLE TCP FLOW BANDWIDTH PROVISIONING, AND ELIMINATION OF PACKET DROPS FOR TRANSMISSION CONTROL PROTOCOL (TCP) AND TCP-FRIENDLY PROTOCOLS

(75) Inventors: Sean S. B. Moore, Hollis, NH (US); Howard C. Reith, Lee, NH (US); Paul Sprague, North Berwick, ME (US)

(73) Assignee: Avaya, Inc., Basking Ridge, NJ (US)

( * ) Notice: Subject to any disclaimer, the term of this patent is extended or adjusted under 35 U.S.C. 154(b) by 1430 days.

(21) Appl. No.: 10/703,186

(22) Filed: Nov. 6, 2003

(65) Prior Publication Data
US 2004/0136370 A1    Jul. 15, 2004

Related U.S. Application Data

(60) Provisional application No. 60/424,331, filed on Nov. 6, 2002.

(51) Int. Cl.
*H04L 12/28* (2006.01)

(52) U.S. Cl.
USPC .......................................... 370/235; 370/389

(58) Field of Classification Search
USPC .............. 370/229, 230.1, 232, 235–236, 351, 370/389
See application file for complete search history.

(56) References Cited

U.S. PATENT DOCUMENTS

| | | | | |
|---|---|---|---|---|
| 5,050,162 A | * | 9/1991 | Golestani | 370/235 |
| 5,473,604 A | * | 12/1995 | Lorenz et al. | 370/229 |
| 5,822,300 A | * | 10/1998 | Johnson et al. | 370/229 |
| 6,141,323 A | * | 10/2000 | Rusu et al. | 370/236 |
| 6,538,989 B1 | * | 3/2003 | Carter et al. | 370/229 |
| 6,594,268 B1 | * | 7/2003 | Aukia et al. | 370/400 |
| 6,798,744 B1 | * | 9/2004 | Loewen et al. | 370/235 |
| 2001/0033581 A1 | * | 10/2001 | Kawarai et al. | 370/468 |
| 2001/0036181 A1 | | 11/2001 | Rogers | 370/389 |
| 2002/0031088 A1 | | 3/2002 | Packer | 670/231 |
| 2002/0085552 A1 | * | 7/2002 | Tandon | 370/389 |

OTHER PUBLICATIONS

TCP/SN: Transmission Control Protocol over Sequenced Networks, Sean S. B. Moore, Ph.D., Cetacean Networks, Inc., 2003.
W. Stallings, "High-Speed Networks: TCP/IP and ATM Design Principles", Prentice-Hall, Upper Saddle River, NJ, USA 1998.
J. Postel et al., "Transmission Control Protocol", RFC 793, Sep. 1981, http://www.ietf.org.rfc/rfc0793.txt.

(Continued)

*Primary Examiner* — Michael Thier
*Assistant Examiner* — Curtis A Alia
(74) *Attorney, Agent, or Firm* — Anderson Gorecki & Rouille LLP

(57) ABSTRACT

A software and hardware system that provides for per flow guaranteed throughput and goodput for packet data flows using network transport protocols that have window-based flow control mechanisms or TCP-friendly flow control mechanisms. The system and method for guaranteed throughput of individual flows in turn enables a method for provisioning link bandwidth among multiple flows and provisioning network throughput and goodput at the granularity of individual flows. The invention also eliminates Layer 3 packet drops for a data flow using window-based flow control or TCP-friendly flow control, which in turn obviates congestion collapse and quality collapse scenarios.

9 Claims, 4 Drawing Sheets

(56) References Cited

OTHER PUBLICATIONS

Braden et al., "Requirements for Internet Hosts—Communication layers", RFC 1122, Oct. 1989, http://www.ietf.org/rfc/rfc1122.txt.
M. Allman et al., "TCP Congestion Control", RFC 2581 Apr. 1999, http://www.ietf/org/rfc/rfc2581.txt.
S. Floyd, "Connections with Multiple Congested Gateways in Packet-Switched Networks Part 1: One-way Traffic", Computer Communication Review, vol. 21 No. 2, Apr. 1991.
S. Bohacek, J. Hespanha, J. Lee, K. Obraczka, "Analysis of a TCP hybrid model", Proc. of the $39^{th}$ Annual Allerton Conference on Communication, Control, and Computing, Oct. 2001.
J. Hespanha et al., "Hybrid Modeling of TCP Congestion Control", Proc. $4^{th}$ Int. Workshop on Hybrid Systems: Computation and Control (HSCC 2001).
V. Jacobson, M. Karel, "Congestion Avoidance and Control", Proceedings of SIGCOMM '88, Stanford, CA Aug. 1988, ACM.
S. Floyd, K. Fall, "Promoting the Use and End-to-End Congestion Control in the Internet", IEEE/ACM Transactions on Networking, Aug. 1999.
S. Floyd, "Congestion Control Principles", RFC 2914, Sep. 2000, http://www.ietf/org/rfc/rfc2914.txt.
D. MacDonald, W. Barkley, "Microsoft Windows 2000 TCP/IP Implementation Details", p. 91, Microsoft Corporation 2000.

* cited by examiner

SYSTEM AND METHOD FOR PER FLOW GUARANTEED THROUGHPUT, MULTIPLE TCP FLOW BANDWIDTH PROVISIONING, AND ELIMINATION OF PACKET DROPS FOR TRANSMISSION CONTROL PROTOCOL (TCP) AND TCP-FRIENDLY PROTOCOLS

This application claims benefit of priority of Provisional Patent Application Ser. No. 60/424,331 filed Nov. 6, 2002.

FIELD OF THE INVENTION

The present invention relates generally to a software and hardware system that provides for per flow guaranteed throughput for packet data flows using network transport protocols that have window-based flow control mechanisms or flow control mechanisms such as rate-based flow control mechanisms that use Additive-Increase, Multiplicative Decrease (AIMD) congestion control and avoidance strategies.

BACKGROUND OF THE INVENTION

The present disclosure presents advancement in the state of the art for networks that carry packet data flows using reliable transport protocols with window-based flow control or TCP-friendly flow control such as described in "Promoting the Use of End-to-End Congestion Control in the Internet", *IEEE/ACM Transactions on Networking*, No. 4, August 1999, pp. 458-472 by S. Floyd and K. Fall, fully incorporated herein by reference, TCP/IP being the most common example.

Currently, TCP is the most widely used transport protocol on packet-switched networks—something like 90% of all packet network traffic uses TCP, and there is a huge installed base of IP devices/appliances (personal computers, host computers, phones, video systems, PDA's, etc.) that use TCP. At least three issues with TCP are that: (1) an endpoint cannot request and receive a throughput/goodput guarantee; (2) in conventional networks, packets will be dropped, which causes TCP to reduce its sending rate; and (3) if multiple flows share a network link of a given bandwidth, a network user cannot specify a particular provisioning of the link bandwidth among the different flows because TCP automatically provisions an equal amount (a fair share) of the link bandwidth among all the flows.

Previous to this invention, no practical general method for per flow guaranteed throughput and goodput existed. The system and method for per flow guaranteed throughput and goodput according to the present invention enables a method for bandwidth, throughput, and/or goodput provisioning of multiple TCP flows across shared links. Furthermore, self-regulating protocols such as TCP use feedback acknowledgement signals for signaling congestion to the sender, for detecting dropped packets, and for controlling the sender's flow rate. Because this invention eliminates Layer 3 packet drops and contention between flows for link resources, it obviates the need for congestion signaling.

In effect, a TCP-based transport system becomes deterministic with respect to throughput, goodput, and reliability at the granularity of individual flows, and it becomes deterministic with respect to provisioning bandwidth, throughput, and goodput among multiple flows sharing common link resources. The deterministic throughput/goodput, zero packet drop behavior, and link bandwidth provisioning capability may have a strong impact on the design of systems and applications above the transport layer and the design and management of networks below the transport layer.

A comprehensive description of the issues with conventional TCP/IP that are solved by this invention, as well as the underlying theory and analysis of the invention, may be found in "TCP/SN: Transmission Control Protocol over Sequenced Networks", by S. Moore.

Hereafter, the term "TCP" will be used to refer to any transport protocol using window-based flow control or TCP-friendly congestion control, such as rate-based congestion control, which has a direct mapping to window-based flow congestion control as disclosed in D. Loguinov, H. Radha, "End-to-End Rate-Based Congestion Control: Convergence Properties and Scalability Analysis", IEEE/ACM Transactions on Networking, August 2003, Vol. 11, No. 4, pps. 564-577 and fully incorporated herein by reference, such as SCTP.

TCP is a complex protocol that was designed for reliable packet data transport over packet data networks, with particular focus on IP networks. For a general overview of TCP, see W. Stallings, "High-Speed Networks: TCP/IP and ATM Design Principles", Prentice-Hall, Upper Saddle River, N.J., USA, 1998; J. Postel et al., "Transmission Control Protocol", RFC 793, September 1981, http://www.ietf.org/rfc/rfc0793.txt; and R. Braden et al., Requirements for Internet Hosts—Communication Layers", RFC 1122, October 1989, http://www.ietf.org/rfc/rfc1122.txt incorporated fully herein by reference. One of TCP's defining characteristics is its ability to self-regulate its flow rate in response to changing network conditions by using a mix of congestion control and congestion avoidance strategies as disclosed in M. Allman et al., "TCP Congestion Control", RFC 2581, April 1999, http://www.ietf/org/rfc/rfc2581.txt incorporated herein by reference. The self-regulation capability allows a set of TCP flows to share network resources and bandwidth fairly, which is critical for autonomous network operation.

Of particular interest is the congestion avoidance strategy in which the signaling stemming from a dropped packet causes the TCP source to multiplicatively reduce its flow rate (e.g., by a factor of two) then additively increase the flow rate until another dropped packet is signaled or until the maximum flow rate is achieved. This type of congestion avoidance uses an Additive-Increase, Multiplicative-Decrease (AIMD) strategy. TCP's AIMD strategy admits "fairness" among multiple TCP flows competing for common network resources. For an additional discussion on this topic, see S. Floyd, "Connections with Multiple Congested Gateways in Packet-Switched Networks Part 1: One-way Traffic", Computer Communication Review, Vol. 21 No. 2, April 1991; S. Bohacek, J. Hespanha, J. Lee, K. Obraczka, "Analysis of a TCP hybrid model", Proc. of the 39th Annual Allerton Conference on Communication, Control, and Computing, October 2001; J. Hespanha et al., "Hybrid Modeling of TCP Congestion Control", Proc. $4^{th}$ Int. Workshop on Hybrid Systems: Computation and Control (HSCC 2001); and D. Loguinov, H. Radha, "End-to-End Rate-Based Congestion Control: Convergence Properties and Scalability Analysis", IEEE/ACM Transactions on Networking, August 2003, Vol. 11, No. 4, pps. 564-577 incorporated herein by reference. In conventional IP networks carrying TCP traffic, an AIMD flow control strategy is critical for maintaining throughput stability. See V. Jacobson, M. Karel, "Congestion Avoidance and Control", Proceedings of SIGCOMM '88, Stanford, Calif., August 1988, ACM; and S. Floyd, K. Fall, "Promoting the Use of End-to-End Congestion Control in the Internet", IEEE/ACM Transactions on Networking, August 1999 incorporated herein by reference. The importance and broad applicability of the AIMD strategy is indicated by the recent result that AIMD is the only fair flow control strategy. See for example D. Loguinov, H. Radha, "End-to-End Rate-Based Congestion Control: Convergence Properties and Scalability Analysis", IEEE/ACM Transactions on Networking, August 2003, Vol. 11, No. 4, pps. 564-577.

Three issues with TCP's flow control mechanism in current TCP/IP implementations are as follows:

An application using TCP as the transport mechanism has no ability to specify a flow rate or to control the packet drop rate—an application must accept the flow rate and packet drop behavior that TCP and the underlying network deliver. TCP has limited control over absolute throughput and packet drop rates—these are dependent on the traffic behavior and configuration of the underlying packet network. Without per flow guaranteed throughput, a system for link bandwidth provisioning among multiple TCP flows cannot be implemented in practice;

If the network also carries packet data traffic that does not follow TCP's congestion control and avoidance strategies, i.e., it is not TCP-friendly, then TCP flows may experience starvation, formally known as congestion collapse, in which flow rate is reduced to unacceptably low values. See S. Floyd, "Congestion Control Principles", RFC 2914, September 2000, http://www.ietf/org/rfc/rfc2914.txt incorporated fully herein by reference. This susceptibility to starvation is exploited by processes that conduct throughput Denial-of-Service (DoS) attacks in which network links, switches, and/or routers are flooded with packet flows that do not use TCP-friendly congestion control mechanisms, such as UDP flows. Congestion collapse may also occur for some TCP flows in a pure TCP environment if those flows have relatively large round-trip times and/or if they experience multiple congested gateways. See S. Floyd, "Connections with Multiple Congested Gateways in Packet-Switched Networks Part 1: One-way Traffic", Computer Communication Review, Vol. 21 No. 2, April 1991;

Conversely, if TCP flows share common resources (such as transmission links with ingress queues) with UDP flows, the flow control behavior of TCP may cause packet loss in the UDP flows. Because many UDP-based applications are sensitive to packet loss, TCP potentially degrades the quality and performance of the UDP-based applications. We refer to the network or flow state in which loss-sensitive applications experience unacceptable levels of packet loss as quality collapse.

For some mission-critical applications, the three issues noted above are unacceptable costs for TCP's transport-level reliability. A typical workaround is to build a separate network that is dedicated to supporting only the mission critical applications and that is highly over-provisioned in the sense that the network's traffic-bearing capacity is much larger than the average traffic volume. Another typical workaround for quality collapse is to use packet prioritization techniques, but such techniques have limited effectiveness, do not scale, and the behavior of network traffic subject to packet prioritization is difficult to analyze and predict.

Such workarounds have financial costs and still cannot provide deterministic throughput/goodput guarantees or packet drop behaviors. There are other schemes to mitigate the problem, such as allocating multiple TCP connections for a single flow or installing ACK proxy systems (see, e.g., R. Packer, "Method for Explicit Data Rate Control in a Packet Communication Environment without Data Rate Supervision", U.S. patent application Publication No. 20020031088 incorporated fully herein by reference), but such approaches do not provide hard guarantees and either require changes to the TCP stack itself or require additional transport-layer (Layer 4) logic.

A solution which provides deterministic flow rates and packet drop behavior for individual flows without expensive overprovisioning may have a major impact on network design planning, operations, management, and administration, as well as networked application system design, e.g., the design of a storage networking system or grid computing system. Furthermore, a solution that does not require any changes to TCP or the transport layer would be compatible with the entire existing installed base of TCP-based networked applications.

When TCP flows are transported over a scheduled network (SN) using the methods of this invention, we will refer to the system as TCP/SN. Several classes of networked applications and services are either directly impacted by TCP/SN or even are created by TCP/SN:

VPN Class: Virtual Private Networks (VPNs) are usually implemented by some form of packet encapsulation. Examples include IPSec-based VPNs and MPLS-based VPNS. Such approaches logically isolate one VPN customer's packets from another VPN customer's packets, but they are not physically isolated within the network. Hence, networks supporting multiple VPNs need to be heavily engineered to minimize the impact of any one VPN's traffic on the performance of the other VPNs. If TCP/SN is used as the basis for a VPN service, then not only can encapsulation overhead and associated interoperability issues be avoided but also the traffic in each VPN will not affect the performance of any other VPN at all.

Reliable Multicast Class: It is widely believed that TCP cannot be used as the basis for a reliable multicast protocol, essentially because of limitations resulting from TCP's original design as a unicast protocol. The main problem is that each branch of the multicast tree experiences different congestion processes but the TCP source congestion control mechanism must respond in aggregate, i.e., if a packet drop occurs on branch A of the multicast tree but not on branch B, the TCP sender still needs to reduce throughput across branch B as well as branch A and resend the packet across both branches. When network congestion is at all significant, a TCP-based reliable multicast protocol will experience congestion collapse. Because TCP/SN guarantees no packet drops from packet congestion, the congestion collapse problem is obviated, and a TCP-based reliable multicast can be implemented, which also obviates the need to develop a new reliable protocol for multicast applications.

Throughput (D)DOS Immunity Class: TCP/SN is completely immune to the class of throughput Denial-of-Service (DoS) or Distributed Denial-of-Service (DDoS) attacks in which an attacker floods the network with packets. Packet flooding causes TCP flows to reduce their throughput to unacceptable low levels. Because a TCP/SN flow does not contend for network resources with any other traffic, it will not experience any throughput degradation during a throughput (D)DOS attack.

Storage Networking Class: To meet requirements for reliability, backup, and restoration of data, organizations implement data storage networks in which data files are stored and retrieved from remote storage devices through packet networks. Some of the associated applications and protocols, such as synchronous replication, distributed RAID, and iSCSI, could benefit directly from the use of TCP/SN.

Information Logistics Class: Information logistics is an emerging class of applications in which shared packet networks will be used to transport (large) blocks of information with requirements that the information transmission is initiated at precise times and finishes on or before a precise deadline ("right information, right time"). An example of an application in this class is grid computing. Because TCP is non-deterministic with respect to throughput in a shared network resource environment, only through extensive overprovisioning can one expect the requirements to be met. In contrast, with TCP/SN only the necessary amount of network resources need be allocated to each task to provide a hard guarantee that the requirement will be met.

SUMMARY OF THE INVENTION

In accordance with principles of the present invention, a system and method, generally referred to herein as TCP/SN, is disclosed that admits per flow guaranteed throughput for TCP, link bandwidth provisioning for multiple TCP flows sharing common resources, network-wide throughput and goodput provisioning for multiple TCP flows at the granularity of individual flows, and zero Layer 3 packet drops. The invention assumes that the underlying network can guarantee a specified flow transmission rate and zero packet drops. As such, the invention describes an efficient mapping of TCP's closed-loop flow control mechanism to a deterministic flow control mechanism provided by an underlying network.

The Present invention, hereinafter sometimes referred to as TCP/SN, fixes the problems mentioned above, not by changing the TCP protocol but by changing the underlying packet switching network. TCP/SN requires a (packet-switched) network that has two properties: 1. The ability to provide a guaranteed, specified amount of bandwidth; and 2. a schedulable buffer in the first router of in the host device sendng the TCP flow (SEP) or in another embodiment, somewhere between the TCP source and the first downstream router along the TCP flow path.

The present invention relates generally to a software and hardware system that provides for per flow guaranteed throughput and goodput for packet data flows using network transport protocols that have window-based flow control mechanisms or TCP-friendly flow control mechanisms.

The system and method for guaranteed throughput of individual flows in turn enables a method for provisioning link bandwidth among multiple flows and provisioning network throughput and goodput at the granularity of individual flows. The invention also eliminates Layer 3 packet drops for a data flow using window-based flow control or TCP-friendly flow control, which in turn obviates congestion collapse and quality collapse scenarios.

The present invention features a system and method for guaranteeing absolute throughput rates for individual TCP or TCP-friendly flows transported by a network with the properties of a scheduled network as disclosed herein. The system and method can also guarantee throughput rates for any transport protocol that uses a flow rate control scheme similar to that used by TCP or TCP-friendly protocols.

A system and method in accordance with the teachings of the present invention eliminates packet drops for individual TCP or TCP-friendly flows transported by a scheduled network. The system and method can also eliminate packet drops for any transport protocol that uses a flow rate control scheme similar to that used by TCP or TCP-friendly protocols.

A system and method in accordance with the present invention provides for absolute provisioning of bandwidth, throughput, or goodput across multiple TCP flows transported by a scheduled network. The system and method can also effect absolute provisioning across multiple flows transported by any TCP-friendly protocol while providing TCP or TCP-friendly protocol flows and applications using TCP flows with immunity to throughput Denial-of-Service (DoS) attacks and throughput Distributed Denial-of-Service (DDoS) attacks, in which network links, routers, and switched are flooded with packets.

The present invention also features a system and method for isolating TCP or TCP-friendly packet flows that share network resources (routers, switches, links, and hosts) with other flows such that TCP or TCP-friendly flows will not contend for network resources at the same time as other flows while at the same time implementing a reliable multicast protocol using TCP or a TCP-friendly protocol as the basis for reliable transmission. Such a system and method may also implement Virtual Private Network (VPN) services over packet-switched networks as well as for implementing Information Logistics applications over packet-switched networks and data storage networking applications and protocols, such as synchronous replication, distributed RAID, and iSCSI, over packet-switched networks.

BRIEF DESCRIPTION OF THE DRAWINGS

These and other features and advantages of the present invention will be better understood by reading the following detailed description, taken together with the drawings wherein.

DETAILED DESCRIPTION OF THE PRESENT INVENTION

Figure 1:
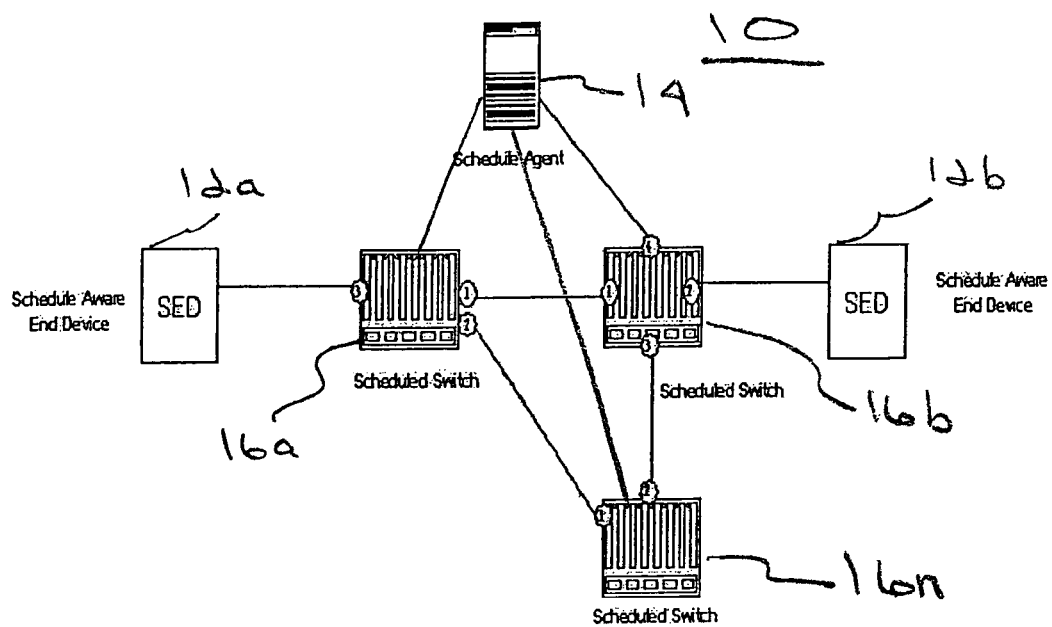
FIG. 1 is a block diagram of a scheduled packet switch architecture on which may be implemented the method of the present invention.

An example of a transport protocol and network environment to which the invention applies is the Transmission Control Protocol (TCP) riding on an Internet Protocol (IP) network, often referred to as the TCP/IP environment. In terms of the International Standards Organization's (ISO) Open Systems Interconnect (OSI) reference model for computer protocol architecture, TCP is a Transport Layer, or Layer 4, protocol, and IP is a Network Layer, or Layer 3 protocol. The present invention assumes that the transport layer can obtain a specific, guaranteed flow rate from the network below Layer 3. An example of such a guaranteed-flow-rate technology is a scheduled packet routing system, or scheduled network, such as that described in the pending patent application titled "Network Switch with Packet Scheduling" [1] incorporated fully herein by reference. A high-level overview of the functions and capabilities of a scheduled network is provided in S. S. B. Moore, C. A. Siller Jr., "Packet Sequencing: A Deterministic Protocol for QoS in IP Networks", IEEE Communications Magazine, October 2003, Vol. 41, No. 10. The invention is not limited to such scheduled networks but will work on any network that can guarantee zero packet drops and a specified bandwidth.

In a network such as described in S. Rogers, "Network Switch with Packet Scheduling", U.S. patent application Ser. No. 09/746,744 and Pub, app. No. 20010036181; and S. S. B.

Moore, C. A. Siller Jr., "Packet Sequencing: A Deterministic Protocol for QoS in IP Networks", IEEE Communications Magazine, October 2003, Vol. 41, No. 10, hereafter referred to as a "scheduled network", each outbound router port continually executes a schedule, which has a fixed period, e.g., 20 milliseconds. A schedule is partitioned into a set of appointments (measured in bytes). For example, if a schedule period is 20 ms, and an appointment size is 250 bytes, then for a 100 Mbps port, there are 1000 appointments (1000 appts=(100 Mbps*20 ms)/(8 bits/byte*250 bytes)) in the schedule. Theoretically, up to 1000 scheduled data flows consisting of packets of size 250 bytes or less can be switched through the port. Note that from system to system, appointments may vary in size (but are preferably of one size in any individual system) and that multiple contiguous appointments may be assigned to a flow in order to handle packets that are larger than one appointment.

A scheduled data flow has a reserved appointment or appointments at each outbound router/switch port in its flow path. The sequence of {appointment, port} pairs for a scheduled data flow is its itinerary. After an itinerary is established, as each packet in a data flow arrives at a (schedule-aware) router, the router must transmit the packet on the outbound port at an assigned appointment time. Because scheduled packets are never placed in a stochastic queue (where they would contend for service with other packets), they do not experience any stochastic queueing delay, nor do they risk being dropped because a stochastic queue is full. Furthermore, there is no packet-level jitter, which guarantees that packets will not be dropped because of a jitter buffer overflow.

The scheduled bandwidth for a flow is computed as the ratio of the number of appointments assigned to the flow in each period to the period, e.g., if a flow has been assigned two (2) 250-byte appointments per 20 ms period, then the scheduled bandwidth is (2 appts/period)*(250 bytes/appt)*(8 bits/byte)*(period/20 ms)=200 Kbps.

Clearly, a scheduled network guarantees a specified flow rate. For example, if appointment sizes are 250 bytes and schedule periods are 20 ms, then a flow consisting of 250-byte packets that is assigned one appointment per period is guaranteed a flow rate of 100 Kbps because ((250 bytes/period)*(8 bits/byte)*(period/0.02 sec))=100 Kbps. If the packets in the flow are smaller than one appointment (or smaller than the sum of the appointment sizes in a contiguous block of appointments allocated to the flow), then the guaranteed flow rate is a fraction of the maximum guaranteed flow rate. Using the example above, if the flow instead consists of packets of size 125 bytes, then the guaranteed flow rate will be 50 Kbps. The maximum guaranteed flow rate is referred to as the scheduled bandwidth.

With a flow rate guarantee provided by the underlying network, the sending and receiving TCP modules of an individual TCP flow can regulate throughput by setting the maximum size of their congestion windows to an appropriate value, as follows: if the guaranteed flow rate of the underlying network is T, and the round-trip time for the TCP control loop is RTT, then the maximum size of the congestion window $W>=T*RTT$. On typical computing platforms, setting the maximum size of the congestion window is accomplished by setting the maximum size of the congestion window is accomplished by setting the socket buffer of the socket assigned to the TCP flow to the maximum size.

A packet flow that wants to use all of its guaranteed throughput capacity should always have a packet available for transmission at the specified appointment time in the first upstream router port in its itinerary; however, a typical TCP implementation does not provide a mechanism for specifying the time at which to launch a packet into the network. There are at least two ways of manipulating a TCP flow such that packets can be made available to the first downstream router at a specified appointment time.

The first method assumes that the sending system uses a real-time operating system (RTOS) with sufficient time granularity. The RTOS ensures that a packet or packets are handed off to the TCP module at relatively precise times. These packets should have the PUSH option set in the TCP header, which will cause the TCP module to immediately transmit the packet(s). This method may be problematic using existing RTOS, host platform, TCP, and IP network technology. For example, standard versions of BSD socket interface do not provide direct access to the PUSH option. A special-purpose TCP module need be developed to support the necessary timing precision for packet launches.

A second method does not place constraints, such as an RTOS and TCP header manipulation, on the sending and receiving systems and will work with any standard TCP implementation. This method assumes the existence of a packet classifier and a schedulable packet buffer somewhere between the TCP sender and the first downstream router. A schedulable packet buffer is under the control of a processor that enforces the itinerary associated with the TCP flow.

The classifier detects incoming packets that are associated with a particular itinerary. Packets so detected are placed in the schedulable packet buffer for the itinerary. As the router executes the associated schedule for the port in the itinerary, it removes from queue and transmits packets in the schedulable packet buffer at the assigned appointment times. In order to avoid buffer overflows and potential packet drops, both the schedulable packet buffer and the scheduled bandwidth B (the guaranteed flow rate) must be large enough to accommodate the flow rate T that the TCP module will attempt to achieve. These values are easily computed—details can be found in "TCP/SN: Transmission Control Protocol over Sequenced Networks", by S. Moore http://www.c-etacean.com/white_papers.htm.

In summary, these methods require routers in the network that can guarantee specific flow rates for Layer 3 traffic. The second method requires a schedulable packet buffer with the properties discussed above. Cetacean Networks has implemented schedulable packet buffers in routers it has developed and has tested them extensively in company laboratories. Laboratory tests have validated the guaranteed throughput, bandwidth provisioning, and zero packet drop properties.

Although not part of the invention, in practice the maximum size of the congestion window for the TCP sender must be large enough to support the desired throughput rate for the current RTT. As detailed in [3], for TCP/SN the maximum throughput rate is limited by the scheduled bandwidth, and there is no penalty for setting the congestion window to a value higher than necessary. Congestion window maximum sizes are typically set as part of system configuration (e.g., see [15]).

In addition to properly setting congestion window maximum size values, a TCP/SN system must also have defined the criteria for packet classification and have associated an itinerary with the schedulable packet buffer. Typical packet classification criteria include source and destination IP address, protocol type, and port number. The itinerary for the TCP/SN flow is established by the SA; local scheduling information that implements the itinerary on a per-SSR basis is resident in each SSR along the itinerary path. In the existing Cetacean Networks implementations of its scheduled network system and TCP/SN, a management system interface is used to request a TCP/SN flow with a particular throughput rate and establish the packet classification criteria. A typical packet classification implementation is IP Access Control List (ACL) technology, found in many routers such as disclosed in Cisco Systems, "Access Control Lists and IP Fragments", Document ID 8014, http://www.cisco.com/warp/public/105/acl_wp.html; and Cisco Systems, "Access Control Lists: Overview and Guidelines", http://www.cisco.com/univercd/cc/td/doc/product/software/ios113ed/113ed_cr/secur_c/scprt3/scacls.htm incorporated fully herein by reference, and implemented in Cetacean Networks routers.

After the request is issued, the management system signals a (software) schedule agent to compute and establish an appropriate itinerary across the routers in the path. Additionally, the first downstream router from the TCP source is signaled by the schedule agent to allocate a schedulable packet buffer for the flow. The router is signaled with the packet classification criteria (assuming that the packet classifier is located in the router).

When the host system's TCP module begins transmitting a TCP/SN flow's packets, the packets are buffered in the schedulable buffer and sent or forwarded from the first router's output port, in accord with that router's schedule information, the latter consistent with the flow's itinerary. At the second downstream router, a schedulable buffer is not necessary but if present will not interfere with operation of TCP/SN. Unlike the first downstream router, the second downstream router knows precisely when packets from the first router will arrive. Like the first router, the second router forwards those packets on to the next router at a precise time. This scheduled forwarding process continues across the routers in the itinerary until the packets reach their destination.

Assuming that the schedulable buffer is properly sized to support the requested throughput, the flow does not drop any packets and achieves a throughput and goodput that matches the amount of scheduled bandwidth allocated for the flow.

Because multiple TCP/SN flows do not contend among themselves or with other traffic for network resources, the throughput performance of any individual TCP/SN flow is completely unaffected by other traffic on the network. Hence, bandwidth provisioning for multiple flows that may share one or more links reduces to ensuring that enough unused bandwidth is available along the path of each TCP/SN flow such that the requested throughput/goodput rate can be supported. Additionally, because TCP/SN flows are unaffected by any other traffic in the network, they are immune to throughput Denial-of-Service (DoS) and Distributed Denial-of-Service (DDoS) attacks in which networks are flooded with malicious attack traffic, the effect being to reduce the throughput of legitimate traffic flows to the point of effectively shutting them down. TCP/SN flows are similarly immune to throughput reductions caused by floods or storms of legitimate traffic, such as what might occur during a national emergency such as the World Trade Center and Pentagon attacks on Sep. 11, 2003 or as might occur during a routing protocol packet storm.

In a system such as that provided by Cetacean Networks, the assignee of the present invention, this bandwidth provisioning logic exists in the schedule agent. With bandwidth provisioning, the throughputs of different TCP/SN flows can be set independently and precisely to different, absolute amounts, a capability that does not exist with existing TCP technologies. Absolute bandwidth provisioning has been implemented and demonstrated by Cetacean Networks.

Some important details need discussion. The zero packet drops property is critical because TCP interprets a packet drop as a signal that the network is congested, and it responds to the congestion signal by multiplicatively reducing its throughput rate to some fraction (typically one-half) of its previous value [4] [7]. Hence, even if the underlying network were a scheduled network that could guarantee a flow rate, any packet drops would cause TCP to operate at less than the guaranteed flow rate. A related detail is that because TCP uses an ACK-based, positive acknowledgement feedback mechanism to signal packet delivery, it is important that the ACK packets reach their destination (the TCP sender); otherwise, a dropped ACK packet or otherwise unreceived/missed ACK packet will eventually be interpreted as a network congestion signal by the TCP sender, which in turn will reduce its throughput rate by half. Hence, the return path in a TCP feedback loop can also be scheduled to ensure that none of the ACK packets are dropped.

FIG. 1 shows a high-level block diagram of a Real-Time Network Scheduled Packet Routing System 10, or scheduled network, used as a reference system for the invention disclosed herein. The three subsystems that compose a Scheduled IP Data Packet Switching System are shown as follows:

A Schedule Aware Endpoint Device (SED) 12a and 12b is any IP compatible network device that is capable of transmitting data packets according to a precise time schedule. The SED functionality subsumes either the RTOS TCP module or the schedulable buffer discussed above.

A Schedule Agent (SA) 14 is a software application that is hosted by, e.g., a general-purpose computer. The SA 14 is responsible for pre-configuring the Scheduled Switches 16a-16n such that they operate on a precise schedule for particular data packets.

The Scheduled Switches 16a-16n, are special IP Packet switches that can maintain a precise schedule for receiving and forwarding packets as determined by the SA. Such special packets switches are available from Cetacean Networks, 100 Arboretum Drive, Portsmouth, N.H. 03801 USA (www.cetacean.com) the assignee of the present invention. The Scheduled Switches are interconnected through various transmission links, e.g. Ethernet, DS-1, E1, DS-3, SONET, SDH, as indicated, although the present invention is not link specific that is, any link/link protocol may be utilized.

Figure 2:
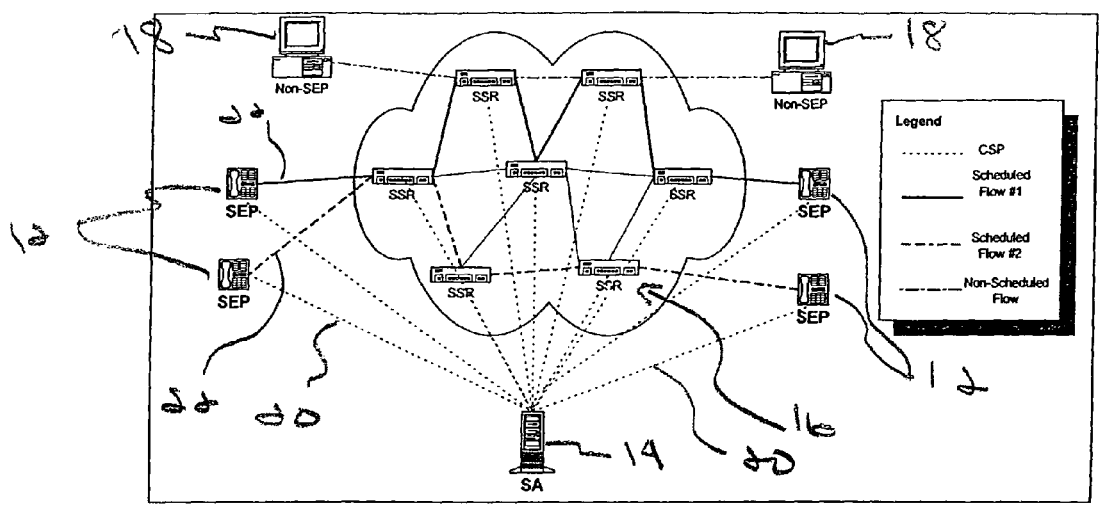
FIG. 2 is a block diagram example of a scheduled network in accordance with the teachings of the present invention in operation.

FIG. 2 shows an example of a scheduled network in accordance with the teachings of the present invention in operation with scheduled and non-scheduled end points. The components of the network are as follows:

Scheduling Agent (SA) 14: The server-based software that controls a scheduled network by establishing packet itineraries based on Quality-of-Service (QoS) needs, throughput or bandwidth needs, network topology, etc. These packet itineraries always include scheduled switch/routers (SSR) and optionally, by definition, scheduled end points (SEP). The SA does not exchange time-based itinerary information with nonscheduled endpoints (non-SEP);

Scheduled Switch/Routers (SSR) 16: The hardware and firmware that interconnects a scheduled network and implements scheduled switching. These may contain schedulable buffers for scheduling flows sourced by non-scheduled end points;

Scheduled End Point (SEP) 12: A scheduled endpoint device is a network-attached communications device, such as a telephone, that, like an SSR, can be signaled by a module, such as an SA, to transmit packets at precise times and can enforce and/or ensure that packets are transmitted at the specified precise times. An example of a scheduled end point is described in S. Rogers, "Scheduled Internet Protocol Telephone Instrument System", U.S. Pat. No. 6,556,564 B2, Apr. 29, 2003. Note that SEP devices are optional for TCP/SN; either a schedulable buffer mechanism or an SEP is used to initiate packet sequencing, i.e., transmission of packets according to a precise schedule. In the context of this invention, SEP's could be computers with the TCP/IP protocol stack, routers and in fact any device which include schedulable buffers suitable for the precisely timed transmission of packets into the network of SSR's. The SA communicates this timing information to the SEP's;

Non-Scheduled End Point (Non-SEP) 18: Non-schedulable devices such as PCs. Flows from these devices can be converted to scheduled flows (e.g., TCP/SN flows) by placing a schedulable buffer between them and the first downstream SSR output port. Currently, schedulable buffers have been implemented in Cetacean Network's SSR's. In FIG. 2, the flows from non-SEP's are depicted as unscheduled.

Cetacean Scheduling Protocol (CSP) 20: An IP-based protocol used to communicate schedule information from a schedule agent 14 to all schedule-aware devices 12 and 16 along a scheduled path 22.

Before any itineraries are established, a network operates like a standard IP network. The SSR's participate in standard protocols such as OSPF to set up routing tables, etc. Packets are routed/switched through the network based on the information in their headers, as in any conventional best-effort IP packet network.

Figure 3:
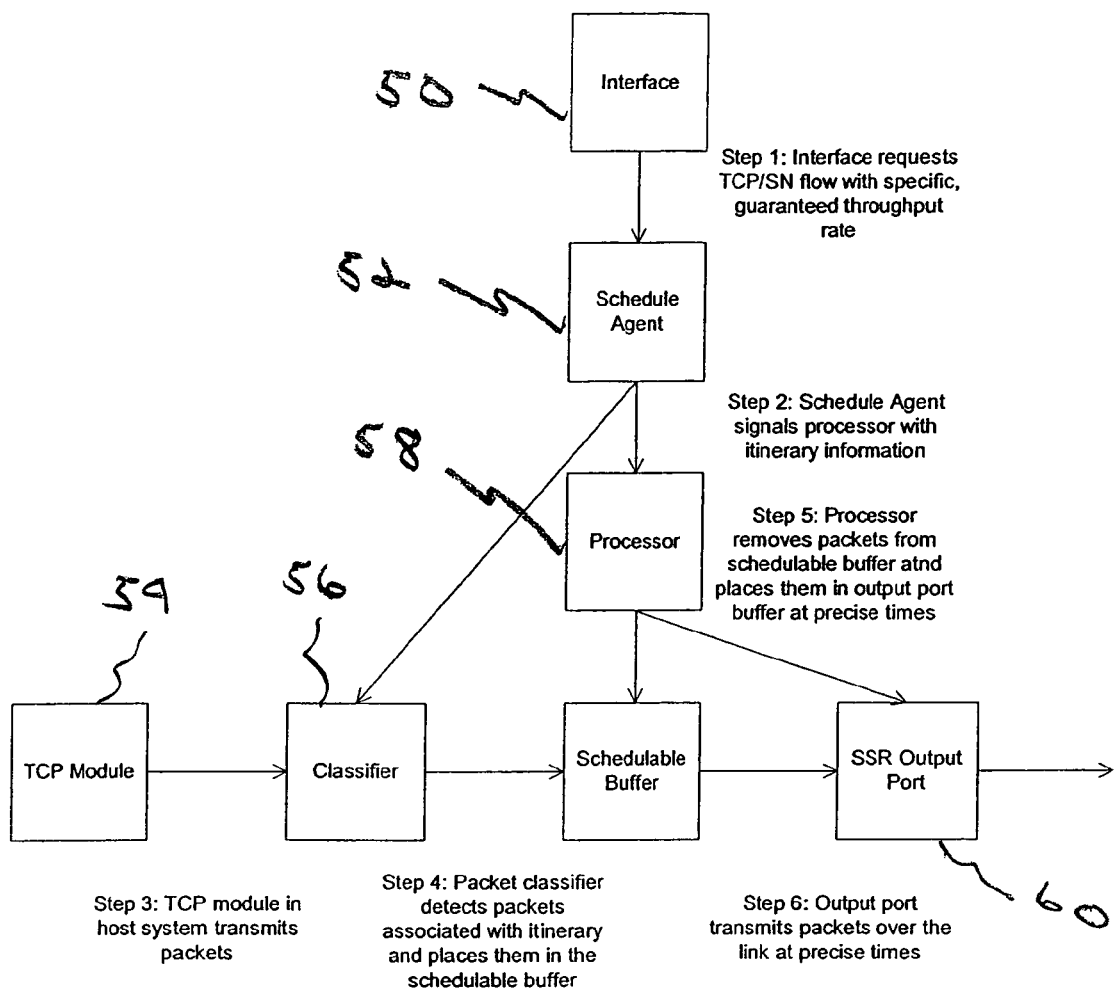
FIG. 3 is a block diagram flow chart of TCP/SN control logic, in accordance with the present invention and in conjunction with a schedule agent, processor, classifier, schedule buffer and SSR output port, the latter being functional elements of the scheduled packet switch architecture shown in FIG. 1.

FIG. 3 shows an annotated block diagram of the acts required to implement TCP/SN control logic in accordance with the teachings of the present invention. In act 50, a human user or automated system (e.g., an application server) uses an Interface to request a TCP/SN flow with a specific, guaranteed throughput rate. The Interface submits the request information to the Schedule Agent, act 52, which then computes an itinerary for the TCP/SN flow. The Schedule Agent signals the relevant itinerary information to the Processor that manages the Schedulable Buffer between the sending TCP Module and the Output Port on the first downstream SSR. Request to initiate a scheduled TCP/IP flow (TCP/SN) could also be signaled to the SA from a suitable SEP.

The relevant itinerary information includes the appointment times and packet sizes for the TCP/SN flow for the Output Port on the first downstream SSR. The Schedule Agent also signals the packet classification criteria for the TCP/SN flow to the Packet Classifier.

In act 54, the TCP Module transmits packets in accordance with standard TCP behavior. The Packet Classifier detects packets that match the classification criteria and places them in the Schedulable Buffer, act 56. In order to ensure zero packet drops, the Schedulable Buffer is assumed to be properly sized, in accordance with the methods discussed in "TCP/SN: Transmission Control Protocol over Sequenced Networks", by S. Moore http://www.cetacean.com/white_papers.htm.

Next, the Processor dequeues a packet from the Schedulable Buffer and places the packet in a buffer for the Output Port before the flow's next appointment time occurs, act 58. At the next appointment time, the Processor instructs the Output Port to transmit the packet in the Output Port buffer across the associated link, which is connected either to another SSR, to the device associated with the destination IP address for the flow, or to some intermediate device that is incorporated in the itinerary, act 60. Acts 54-62 are repeated until the Interface is used to tear down the TCP/SN flow.

Figure 4:
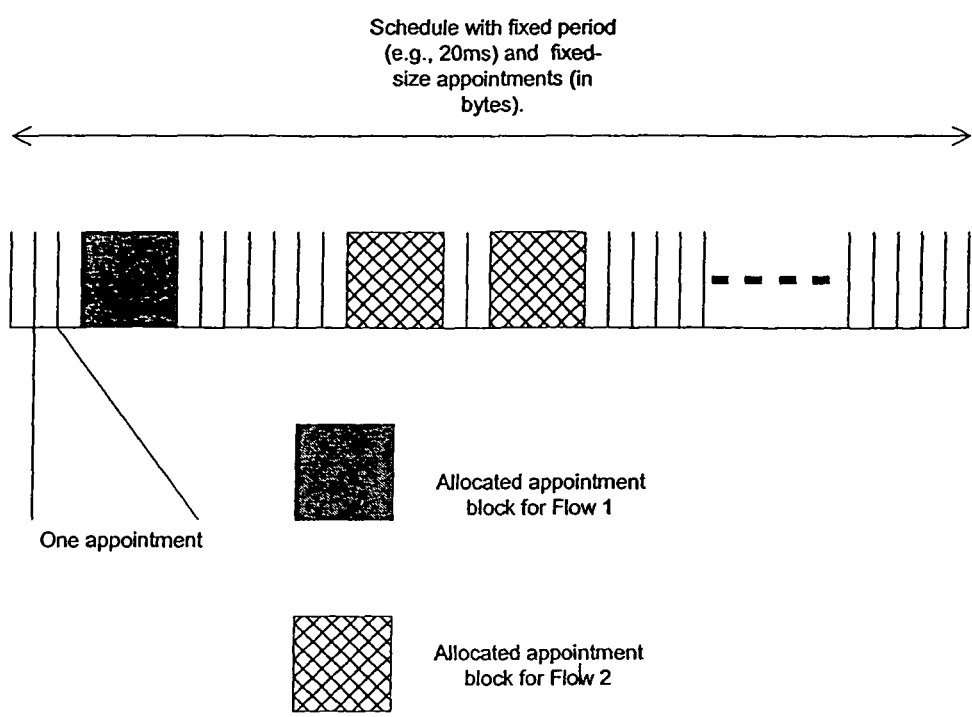
FIG. 4 is a representation of absolute bandwidth provisioning for two flows in a system operating in accordance with the method of the present invention.

FIG. 4 provides a pictorial representation of absolute bandwidth provisioning logic for two TCP/SN flows that share a link. For concreteness, a scheduled or sequenced network like that described in S. Rogers, "Network Switch with Packet Scheduling", U.S. patent application Ser. No. 09/746,744 and Pub, app. No. 20010036181 and S. S. B. Moore, C. A. Siller Jr., "Packet Sequencing: A Deterministic Protocol for QoS in IP Networks", IEEE Communications Magazine, October 2003, Vol. 41, No. 10. is assumed, but as is the case elsewhere in this document, any network with similar relevant properties can be assumed and is considered within the scope of this disclosure and invention. The graphic shows the schedule for the output port feeding the shared link. If the schedule has a 20 ms period, an associated link speed of 100 Mbps, and appointments with a fixed size of 250 bytes, then there are 1000 appointments in each (repeating) schedule.

FIG. 4 shows that Flow 1 has been allocated a contiguous block of 4 appointments in the schedule, each implying that the associated TCP/SN flow has been provisioned with 400 Kbps of scheduled bandwidth. Unless some fragmentation scheme has been employed, the allocation also implies that Flow 1's packets will be of size 1000 bytes or less. Flow 2 has been allocated 2 blocks of 4 contiguous appointments, implying that the associated TCP/SN flow has been provisioned with 800 Kbps of scheduled bandwidth.

As with Flow 1, the allocation also implies that Flow 2's packets will be of size 1000 bytes or less. Because throughput rates for TCP/SN flows are regulated by the scheduled bandwidth and not by TCP's rate control mechanism [3], Flow 2's throughput rate will be twice that of Flow 1, thus effecting absolute bandwidth provisioning between multiple TCP flows sharing links.

Therefore, in accordance with the teachings herein, the present invention provides a software and hardware system that provides for per flow guaranteed throughput and goodput for packet data flows using network transport protocols that have window-based flow control mechanisms or TCP-friendly flow control mechanisms. The system and method for guaranteed throughput of individual flows in turn enables a method for provisioning link bandwidth among multiple flows and provisioning network throughput and goodput at the granularity of individual flows. The invention also eliminates Layer 3 packet drops for a data flow using window-based flow control or TCP-friendly flow control, which in turn obviates congestion collapse and quality collapse scenarios.

Modifications and substitutions by one of ordinary skill in the art are considered to be within the scope of the present invention which is not to be limited except by any claims filed based on this provisional patent application.

What is claimed is:

1. A scheduled data packet switching network comprising:
 a data packet switching network providing a data packet flow path having a guaranteed specified bandwidth at the granularity of a single data packet flow, wherein said data packet switching network transports packet flows using TCP (Transmission Control Protocol) or a TCP-friendly protocol;
 a schedulable buffer, disposed between a data packet source and a first downstream device in the data packet flow path, and wherein said packet switching network provides a data packet switching network having zero packet drops;
 wherein said schedulable buffer provides a mapping of TCP's closed loop flow control mechanism to a deterministic flow control network provided by the underlying network to provide the data packet switching network having zero packet drops, wherein said deterministic flow control network has a reserved appointment at each outbound switch in its flow path; and
 a scheduling agent, responsive to a request to transmit at least one data packet at a scheduled time, for issuing configuration information including at least data packet delivery scheduling information, to at least one said downstream device; and at least one scheduled switch, responsive to received configuration information including at least scheduling information and to received data packets, for forwarding said received data packets according to a precise schedule as dictated by said data packet delivery scheduling information received from said schedule agent.

2. The network of claim 1, wherein said data packet source includes a data host.

3. The network of claim 2, wherein said host includes a scheduled endpoint device.

4. The network of claim 2, wherein said first downstream device includes a router.

5. A system for scheduling data packet delivery comprising:

a packet switching network providing a data packet flow path having a guaranteed specified bandwidth at the granularity of a single data packet flow, wherein said packet switching network transports packet flows using TCP or a TCP-friendly protocol;

a scheduling agent, responsive to a request to transmit at least one data packet at a scheduled time, for issuing configuration information including at least data packet delivery scheduling information, to at least one scheduled switch; and the at least one scheduled switch including a schedulable buffer, disposed between a data packet source and a first downstream device in the data packet flow path, responsive to received configuration information including at least scheduling information and to received data packets, for forwarding said received data packets according to a precise schedule as dictated by said data packet delivery scheduling information received from said schedule agent, and wherein said packet switching network provides a data packet switching network having zero packet drops, wherein said schedulable buffer provides a mapping of TCP's closed loop flow control mechanism to the a deterministic flow control network provided by the an underlying network to provide the data packet switching network having zero packet drops, wherein said deterministic flow control network has a reserved appointment at each outbound switch in its flow path.

6. A method for providing a data packet switching network comprising the acts of:

providing a data packet switching network which provides a data packet flow path having a guaranteed specified bandwidth at the granularity of a single data packet flow, wherein said data packet switching network transports packet flows using TCP (Transmission Control Protocol) or a TCP-friendly protocol;

providing a schedulable buffer, disposed between a data packet source and a first downstream device in the data packet flow path;

receiving a request to transmit at least one data packet at a scheduled time;

responsive to said received request, issuing configuration information including at least data packet delivery scheduling information to at least one scheduled switch; and responsive to said issued configuration information, receiving, by said schedulable buffer the at least one data packet and forwarding said at least one received data packet according to a precise schedule as dictated by said data packet delivery scheduling information, and wherein ssaid packet switching network provides a data packet switching network having has zero packet drops, wherein said schedulable buffer provides a mapping of TCP's closed loop flow control mechanism to the a deterministic flow control network provided by the an underlying network to provide the data packet switching network having zero packet drops, wherein said deterministic flow control network has a reserved appointment at each outbound switch in its flow path.

7. The method of claim 6, wherein said data packet source includes a data host.

8. The method of claim 7, wherein said host includes a scheduled end device.

9. The method of claim 7, wherein said first downstream device includes a router.

* * * * *